Figure 1:
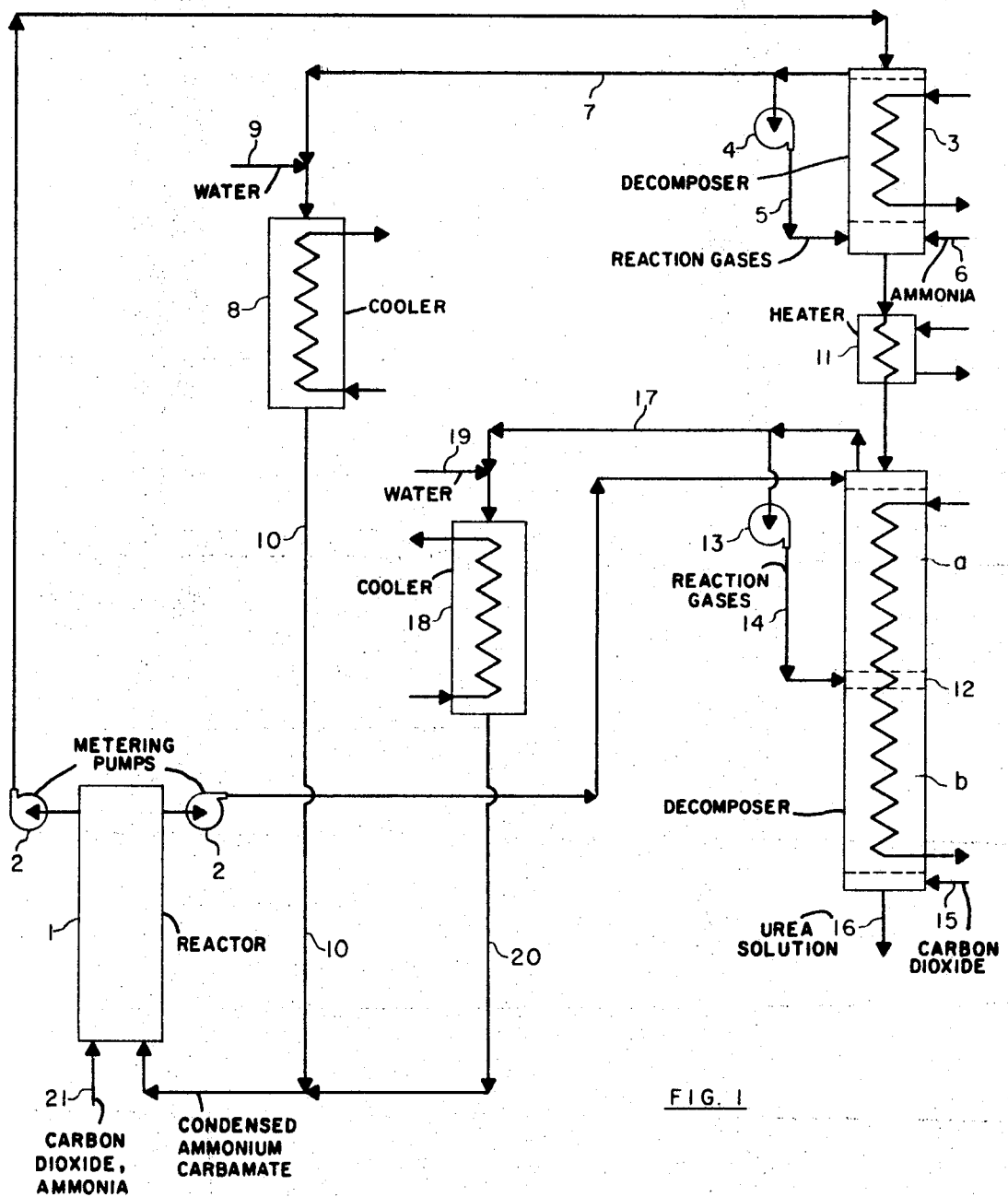

United States Patent

[11] 3,607,938

[72] Inventor Wilhelm F. Braun
 Lucerne, Switzerland
[21] Appl. No. 730,111
[22] Filed May 17, 1968
[45] Patented Sept. 21, 1971
[73] Assignee Chemical Construction Corporation
 New York, N.Y.
[32] Priority May 22, 1967
[33] Switzerland
[31] 7182/67

[54] PROCESS FOR THE SYNTHETIC MANUFACTURE OF UREA FROM AMMONIA AND CARBON DIOXIDE
 19 Claims, 3 Drawing Figs.

[52] U.S. Cl. .................................................. 260/555 A
[51] Int. Cl. .................................................. C07c 127/00
[50] Field of Search .......................................... 260/555, 555 A

[56] References Cited
 UNITED STATES PATENTS
 3,470,247 9/1969 Guadalupi .................. 260/555

Primary Examiner—Bernard Helfin
Assistant Examiner—Michael W. Glynn
Attorney—J. L. Chaboty ABSTRACT: A process is provided for the synthetic manufacture of urea from ammonia and carbon dioxide, in which the ammonium carbamate contained in the urea synthesis effluent stream is stripped and separated in mixed off-gas and returned to the synthesis reactor. The stripping of the carbamate takes place using previously separated mixed off-gas which is carried in a cycle to the heated stripping zone. A feed gas component which may be ammonia or carbon dioxide is also introduced into the zone, so that the total stripping proceeds either in one stage with ammonia or carbon dioxide addition, or in two stages, with the synthesis effluent stream being divided into two portions which flow in parallel to the separate stages. In the first stage, ammonia is added for stripping, and in the second stage carbon dioxide is added. An amount of at least 40 percent of the synthesis effluent stream is admitted to the first decomposition and stripping stage which operates at synthesis pressure, and a mixture consisting of the remainder of the synthesis effluent stream and the solution flowing from the first stage is added to the second stage, which may be operated at reduced pressure.

WILHELM F. BRAUN
INVENTOR.

WILHELM F. BRAUN
INVENTOR.

PROCESS FOR THE SYNTHETIC MANUFACTURE OF UREA FROM AMMONIA AND CARBON DIOXIDE

BACKGROUND OF THE INVENTION

1. Field of the Invention

The invention relates to urea synthesis from ammonia and carbon dioxide at elevated pressure.

2. Description of the Prior Art

The urea synthesis from ammonia and carbon dioxide proceeds at increased pressure and increased temperature in two successive reactions which may take place in the same reaction chamber. The first reaction is the highly exothermic formation of ammonium carbamate from 1 mole carbon dioxide plus 2 moles ammonia, which is subsequently converted into urea with a small heat requirement, with splitting off of water. The first reaction may be considered quantitative, while the second forms an equilibrium and yields in practice an average conversion of 50 percent.

The equilibrium in the reaction chamber is influenced among other things by an excess of ammonia which raises the conversion rate, and by an additional water content which decreases the conversion. The mixture discharged from the reactor contains urea as desired product which is dissolved in liberated water, and in addition, ammonium carbamate, excess amounts of ammonia or carbon dioxide and possibly an additional amount of water. For the complete conversion of the ammonia and carbon dioxide reaction components, the ammonium carbamate must be decomposed again, and the gases and the additional water separated and returned into the reactor.

The newer developments propose to condense the decomposed and separated gases, to dissolve them in water and to return this solution to the reactor. The separation called "-stripping" includes the liberation of the dissolved reaction components which may be present in excess, as well as the decomposition of the ammonium carbamate into its gas components. The heat requirement per mole for these two simultaneous separation processes is very different, and the heat requirement for the decomposition amounts to a multiple of the requirement for the liberation.

For the stripping procedure, in addition to the heat input, pressure decrease or temperature increase or both measures simultaneously are required. An increase of the temperature increases the risk of urea decomposition and biuret formation. Because of the decrease in pressure, the condensed carbamate solution will not flow into the reactor but must be pumped into it. In place of the decrease of the total pressure, the partial pressure of the gases to be stripped may be decreased by adding other gases. In the following patents are described additions of inert gas, carbon dioxide as one reaction component, and ammonia as the other component: British Pat. No. 853,220, German Pat. No. 1,166,769 and Austrian Pat. No. 244,984.

The stripping by means of inert gases may be operated most intensively, because their amount is not limited by the requirement for the process. The disadvantages lie in the power requirement for the compression, and in the separation of the ammonia from the inert gas stream, before the latter is used otherwise or can be returned again to the decomposition.

The stripping by means of carbon dioxide is advantageous, because this reaction component must in any case be brought up to reactor pressure. A further advantage lies in the fact that above the sump of the decomposer is a gas mixture consisting mainly of carbon dioxide. A certain amount of carbon dioxide will be dissolved in the discharged urea solution, but this loss influences only slightly the economy of the synthesis, because byproduct carbon dioxide should be available without cost. In this method, it is not advantageous to choose a molar ammonia: carbon dioxide ratio in the reactor which deviates considerably from 2.

The publication by Frejacques (Chimie et Industrie, 60) of the year 1948, already shows that a large molar excess, especially of ammonia, shifts the equilibrium of the urea reaction in such a way that 60 to 70 or more percents of the carbamate are converted into urea. The method mentioned supra must do without this advantage. An essential excess of ammonia brings still other advantages: a decrease of biuret formation and decomposition of the urea at higher temperatures which may occur during stripping, and protection against corrosion of the materials of construction for the equipment.

According to another process, the stripping is carried out by means of ammonia. The publication of Frejacques shows that the decomposition with an essential excess of one of the two reaction components is considerably alleviated in the gas phase, whereby a carbon dioxide excess is more effective. A larger amount of ammonia must therefore be supplied than would be necessary when using carbon dioxide.

Above the sump of the decomposer, there is mostly ammonia in the gas phase, the partial pressure of which corresponds almost to the total pressure. A large amount of ammonia is dissolved under this pressure in the discharging urea solution. This amount reaches a maximum, when the decomposition is not carried out at an intermediate pressure, but at full pressure of the synthesis reactor. In the example of the pertinent process patents, it is also indicated that the ammonia addition is approximately 3.1 times as much as is required for the reaction, and that the urea solution flowing out of the sump contains 2.1 times the required amount of ammonia. After expansion of the solution, this ammonia must be distilled off, condensed, and returned to the decomposer. Additional process steps cause additional ammonia losses, and a 2.1 times pumping power must also be regarded as lost.

For the condensation of the driven-off gases and their return to the reactor, it is advantageous that they have a sufficient amount of water. When in practical operation a certain amount of water for regulation has to be added from the outside, the discharging urea solution must contain more water than is obtained in the reaction. Otherwise, the system is enriched with water, the equilibrium is shifted, and the conversion of ammonium carbamate into urea is decreased. This is the case in all examples given in patents, in which the weight ratio of water to urea in the solution discharging from the decomposition is smaller than 0.3:1.

SUMMARY OF THE INVENTION

Surprisingly, it has now been found, that all mentioned disadvantages of other processes can be avoided and that the economy of the urea manufacture is increased, when the stripping is carried out by already separated reaction gases carried in a cycle, either in one or in two stages.

The process according to the present invention for the synthetic manufacture of urea from ammonia and carbon dioxide, in which the ammonium carbamate contained in the reaction mixture is again separated and returned to the reactor, is thereby characterized that the stripping of the carbamate takes place through already separated reaction gases carried in a cycle, to which is each time introduced the maximum amount of the reaction component required for the reaction, whereby the total stripping proceeds either in one stage with ammonia addition or carbon dioxide addition, or in two stages of which one obtains an ammonia addition, and the other a carbon dioxide addition, and whereby to the first decomposition stage, operating at reactor pressure, is admitted an amount of 40–100 percent of the reaction mixture, while to the second stage a mixture is added consisting of the remainder of the reaction mixture and the urea solution flowing off from the first stage.

It is an object of the present invention to provide an improved process for the synthesis of urea from ammonia and carbon dioxide.

Another object is to strip unreacted excess ammonia and ammonium carbamate from the urea synthesis effluent stream in an improved manner.

A further object is to utilize feed streams of ammonia and carbon dioxide together with mixed off-gas to strip the urea synthesis effluent stream in a urea synthesis process.

These and other objects and advantages of the present invention will become evident from the description which follows.

DESCRIPTION OF THE DRAWINGS AND PREFERRED EMBODIMENTS

Three types of execution of the process according to the invention are described below as nonlimiting variants.

FIG. 1 shows the reactor 1, from which metering pumps 2 pass the discharging reaction mixture to the two decomposers 3 and 12, which are heated to cover the heat requirement. To the decomposer 3, already separated reaction gases are added again at the bottom of the decomposer through the blower 4 via line 5. The amount of preheated ammonia required for the reaction is added partly or completely at 6. The solution discharging in the sump from the decomposer 3 contains more dissolved ammonia than is added at 6. The reactor 1 is operated with high ammonia excess, and the ammonia contained in the reaction mixture may be more easily liberated than that bound in the form of carbamate. The gases discharging via line 7 are condensed in cooler 8, and the solution, to which water may be added at 9, flows back to the reactor 1 via line 10.

The solution flowing out of decomposer 3 is superheated for a short time in heating vessel 11. The superheating will not have disadvantageous effect because of the high ammonia content, and when entering the second decomposer 12 it is immediately ended by the spontaneous liberation of a part of the dissolved ammonia.

The decomposer 12 is subdivided into two sections. In the top section a, into which carbon dioxide flows from the bottom section b, the stripping is effected by the cycle via blower 13 and line 14. At 15, a part of the carbon dioxide required for the reaction is added to section b which serves mainly for the thorough removal of residual ammonia. The very pure urea solution is expanded via line 16. The gases discharging via line 17 are condensed in cooler 18, and the solution to which water may be added at 19 flows back to the reactor via line 20.

The remaining amount of carbon dioxide and possibly also a remaining amount of ammonia is directly passed through the reactor at 21.

Figure 2:
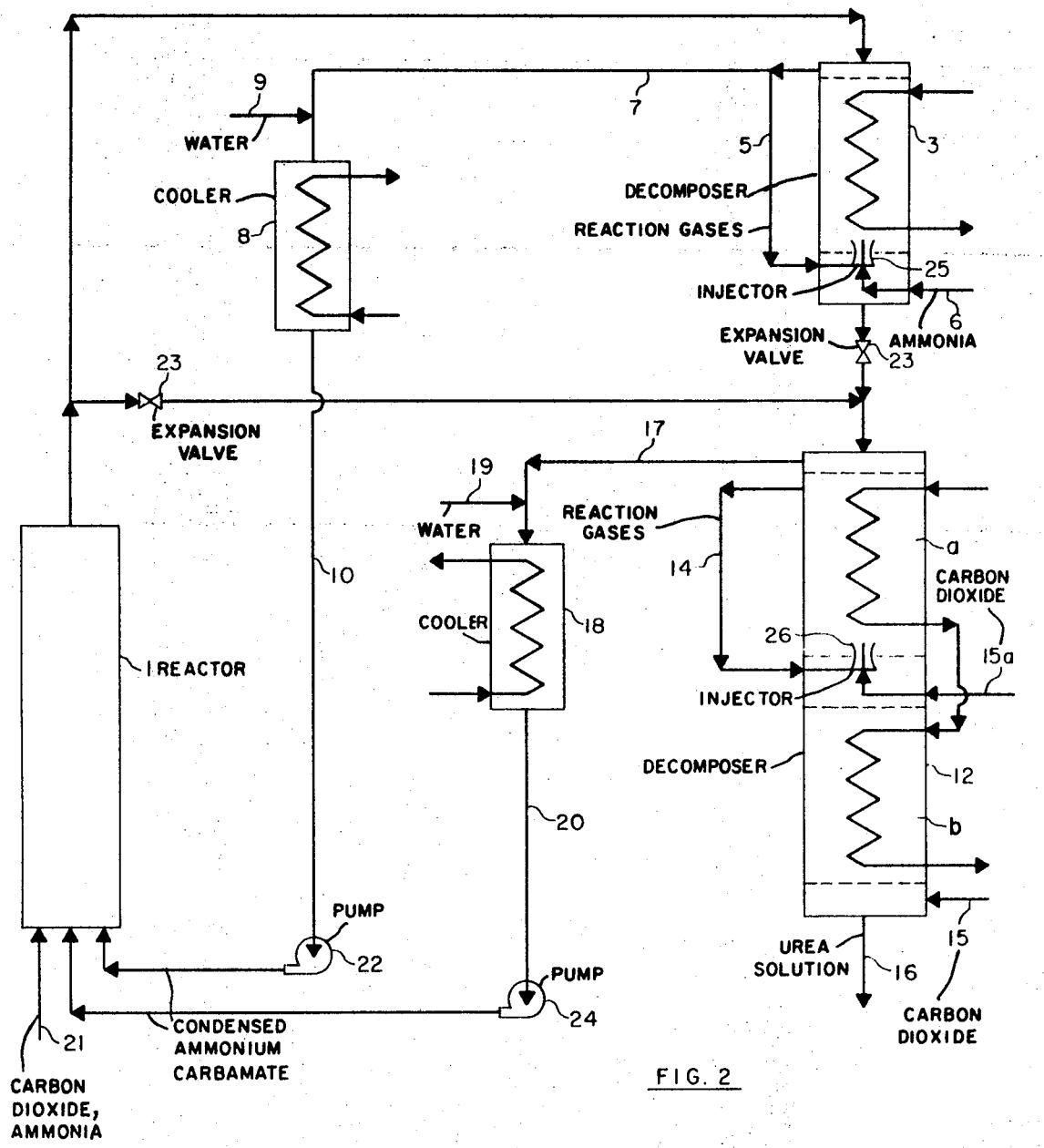

FIG. 2 also shows a two-stage decomposition, in which, however, the second stage operates at lower pressure. The pressure difference is determined by the final pressures of the carbon dioxide compressor stages and by the delivery head of pump 24, which forces the carbamate solution from the second decomposer 12 to the reactor. The following differences exist from FIG. 1: the reactor is operated at the inlet pressure of the first decomposer 3, the metering pumps 2 are therefore omitted. Also, the carbamate solution from cooler 8 and line 10 must be forced by pump 22 into reactor 1. The solution flowing out of the first decomposer is not heated, and the heating vessel 11 is omitted. The solution flowing out of 3, as well as the amount of reaction mixture introduced into the second decomposer, are expanded via expansion valves 23. The blowers 4 and 13 for the recirculation of the separated gases are replaced by injectors 25 and 26, into which are introduced the reaction components at 6 (ammonia) and at 15 a (carbon dioxide), at increased pressure.

Figure 3:
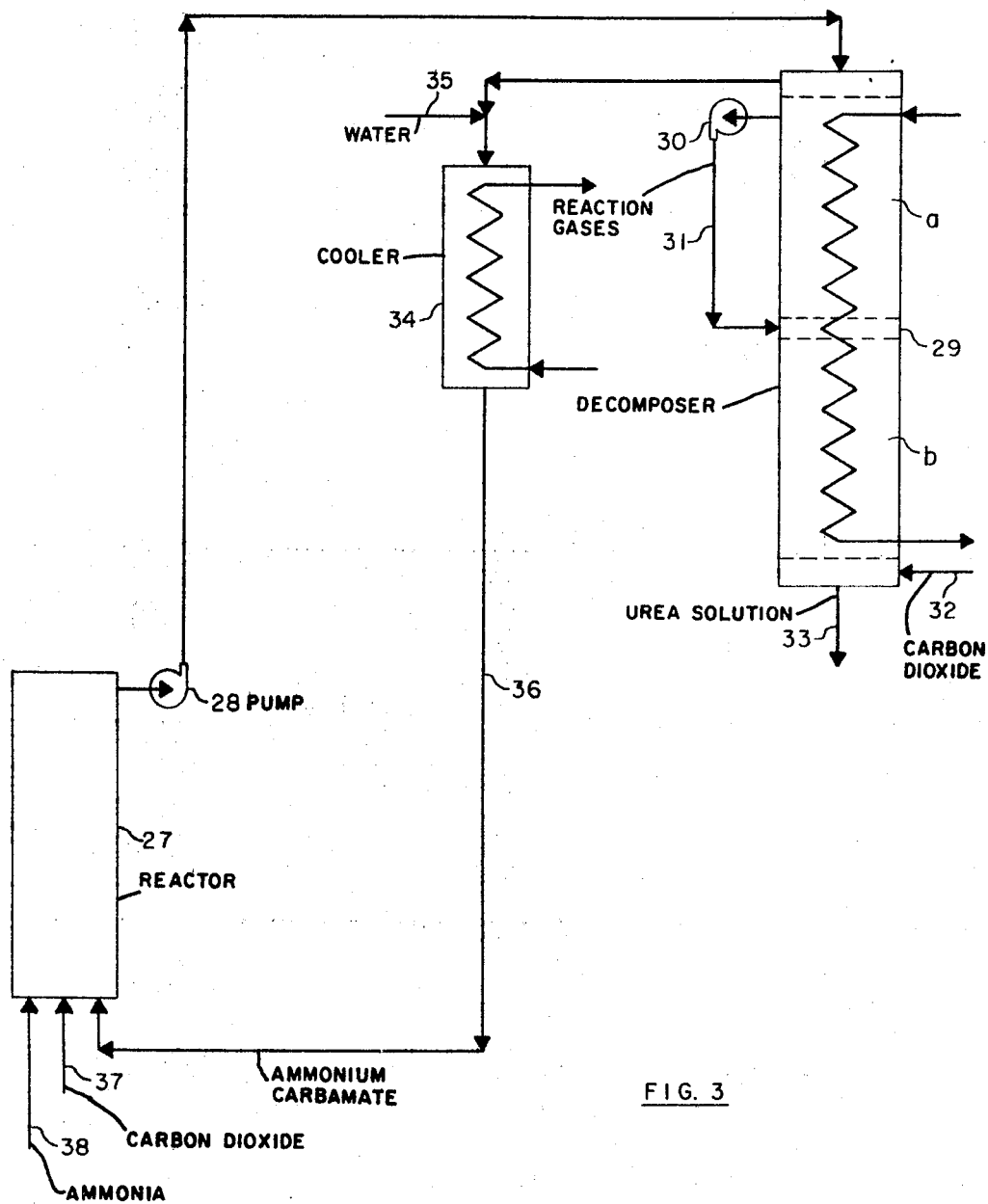

FIG. 3 shows the one-stage decomposition. Reactor 27 is operated with a large ammonia excess. The pump 28 sends the reaction mixture to decomposer 29 provided with sections a and b. In the top section a, the liberation of the dissolved ammonia and a partial carbamate decomposition is effected by the recirculation of separated gases via blower 30 and line 31. In the bottom section b the remaining stripping is carried out by means of the amount of carbon dioxide added at 32. The urea solution is expanded via line 33. The separated gases are condensed in cooler 34 to which water may be added at 35, and the carbamate solution flows back to the reactor via line 36.

The remaining part of the amount of carbon dioxide required for the reaction is introduced into the reactor directly at 37, and the total amount of ammonia at 38.

During the decomposition of ammonium carbamate, a content of inert gases acts favorably insofar as their amount decreases the partial pressure of the reaction components. The inert gases are not especially introduced into the system according to the process of this invention. They are contained in the carbon dioxide as impurities at an order of magnitude from 0.5 to 10 percent —preferably from 1 to 4 percent. Their amount and their composition are dependent on the scrubbing process through which the carbon dioxide is recovered. Carbon dioxide from the mixed gas of an ammonia synthesis, which has passed through a carbon monoxide-conversion, has typically contained about 2 percent hydrogen plus nitrogen.

The inert gases pass together with the carbon dioxide, either via reactor 27 or directly into decomposer 29. They are not condensed in cooler 34, and are therefore enriched between decomposer and cooler. In all processes, they have to be again removed from the system without consideration whether they were enriched or not.

The enrichment has a favorable economic effect, because the portion of the reaction components, which have to be returned again into the cycle with additional power consumption, becomes smaller. The parts of the reaction components of the inert gas to be discharged may be additionally reduced, by installation of an already-known residual gas scrubber which is charged with that amount of water that has to be returned into the high-pressure cycle at 35, in order to again attain the requisite excess water.

The inert gases, which together with the separated reaction gases, are carried in a cycle in the process of this invention, contrary to other processes using inerts for decomposition, must neither be specially supplied nor in a special way cleaned or processed.

FIGS. 1 to 3 show the process equipment. The elements, such as heated decomposition columns, heating vessel, cooler, etc., are known. What is new is the arrangement of these elements pertaining to the process according to the invention.

The following example shows that it is possible, according to the process of this invention, to achieve a high conversion rate of ammonium carbamate into urea through a large ammonia excess, and to decrease at the same time the danger of corrosion, without supplying the high-pressure system with larger amounts of the reaction components than are required for the reaction itself.

EXAMPLE

According to the process variant in FIG. 1, in reactor 1 at a pressure of 132 atmospheres absolute (ata) and a temperature of 180° C., a mole ratio of ammonia to carbon dioxide of 4:1 is maintained. A 65 percent conversion of carbamate into urea is achieved at a small excess of water. The discharging reaction mixture consists in weight percents altogether of:

Urea 32.7 percent Water 15.9 percent Ammonia 38.5 percent Carbon Dioxide 12.9 percent 80 percent of the reaction mixture and the total amount of ammonia required are introduced to the first decomposition stage. The decomposer 3 operates at a pressure of 135 ata and at a temperature of 180°, the decomposer 12 operates at 133 ata and at 170°. The molar ratio of the recirculated amount of gas to the fed reaction component amounts to 2.5:1 in decomposer 3 and 2:1 in decomposer 12. To decomposer 12 are added: 20 percent of the reaction mixture, the solution discharging from decomposer 3 and 45 percent of the carbon dioxide required for the reaction. The solution flowing out of decomposer 3 is superheated to 190° in heating vessel 11 for a short time. The refluxes to reactor 1 via the two lines 10 and 20 and the urea solution discharging at 16 have the following composition in weight percents, and the urea composition includes a biuret content of about 0.3 percent:

|  | Total Reflux | Urea Solution |
|---|---|---|
| Urea |  | 71.69% |
| Water | 4.9 | 25.80% |
| Ammonia | 68.0 | 0.36% |
| Carbon Dioxide | 27.1 | 2.15% |

The urea solution has an excess of discharging water, which has to be added back to the reflux circulation at 9 and 19 for the purpose of regulation. The water content in the total reflux then increases to 7.1 percent.

I claim:

1. In a urea synthesis process in which ammonia and carbon dioxide are reacted at elevated pressure produce a urea synthesis effluent stream principally containing urea, ammonium carbamate and water, said effluent stream is heated to decompose ammonium carbamate and produce a mixed off-gas principally containing ammonia, carbon dioxide and inerts, and said mixed off-gas is separated from the residual liquid phase principally containing urea and water, the improvement which comprises
   a. passing said effluent stream downwards through a heated stripping zone, wherein said mixed off-gas is formed,
   b. removing said mixed off-gas from the upper section of said zone,
   c. recycling a portion of the mixed off-gas removed according to step (b) to said zone below the upper section, whereby the liquid phase in said zone is stripped,
   d. passing a feed gas selected from the group consisting of ammonia and carbon dioxide into the lower section of said zone, whereby said feed gas strips the liquid phase in said zone and combines with said recycled mixed off-gas portion within said zone, and
   e. removing said residual liquid phase from the bottom section of said zone.

2. The process of claim 1, in which said urea synthesis effluent stream contains excess unreacted ammonia, and said excess ammonia is at least partially removed from the liquid phase in said mixed off-gas.

3. The process of claim 1, in which said heated stripping zone is substantially vertical.

4. The process of claim 1, in which the residual portion of said mixed off-gas remaining after said portion is recycled according to step c (c), is cooled to condense an ammonium carbamate solution, and said ammonium carbamate solution is recycled to said reaction of ammonia and carbon dioxide to produce said urea synthesis effluent stream.

5. The process of claim 4, in which water is added to said residual portion of said mixed off-gas prior to cooling, and the resulting aqueous ammonium carbamate solution formed after cooling is recycled to said reaction of ammonia and carbon dioxide to produce said urea synthesis effluent stream.

6. The process of claim 1, in which the portion of the mixed off-gas recycled according to step (c) is added to the middle section of said zone, and said feed gas is carbon dioxide, said carbon dioxide feed gas being added to the bottom section of said zone.

7. The process of claim 1, in which the portion of the mixed off-gas recycled according to step (c) is added to the bottom section of said zone, and said feed gas is ammonia, said ammonia feed gas being added to the bottom section of said zone.

8. A process for the synthesis of urea from ammonia and carbon dioxide which comprises
   a. reacting ammonia, carbon dioxide and recycled aqueous ammonium carbamate solution at elevated pressure, whereby a urea synthesis effluent stream principally containing urea, ammonium carbamate, ammonia and water is formed,
   b. dividing said urea synthesis effluent stream into a first portion and a second portion,
   c. passing said first portion downwards through a first heated stripping zone, wherein ammonium carbamate is decomposed and a first mixed off-gas is formed,
   d. removing said first mixed off-gas from the upper section of said first zone,
   e. recycling a portion of the first mixed off-gas removed according to step (d) to said first zone below the upper section, whereby the liquid phase in said first zone is stripped,
   f. passing an ammonia feed gas into the lower section of said first zone, whereby said ammonia feed gas strips the liquid phase in said first zone and combines within said first zone with said mixed off-gas portion recycled according to step (e),
   g. passing the stripped residual liquid phase removed from the bottom section of said first zone to the upper section of a second heated stripping zone, whereby said residual liquid phase flows downwards through said second zone,
   h. passing said second portion formed by step (b) downwards through said second zone, whereby said second portion combines with said residual liquid phase from said first zone, and ammonium carbamate is decomposed in said second zone and a second mixed off-gas is formed,
   i. removing said second mixed off-gas from the upper section of said second zone,
   j. recycling a portion of the second mixed off-gas removed according to step (i) to said second zone below the upper section, whereby the liquid phase in said second zone is stripped,
   k. passing a carbon dioxide feed gas into the lower section of said second zone, whereby said carbon dioxide feed gas strips the liquid phase in said second zone and combines within said second zone with said mixed off-gas portion recycled according to step (j),
   l. removing a residual liquid phase comprising aqueous urea solution from the bottom section of said second zone,
   m. cooling the residual portions of said first and second mixed off-gas streams remaining after said portions are recycled according to steps (e) and (j), whereby first and second aqueous solutions containing ammonium carbamate are formed by condensation of mixed off-gas, and
   n. recycling the aqueous solutions formed according to step (m) to urea synthesis as said recycled aqueous ammonium carbamate solution of step (a).

9. The process of claim 8, in which said first and said second heated stripping zones are substantially vertical.

10. The process of claim 8, in which water is added to said residual portions of said off-gas streams prior to cooling according to step (m), and the resulting aqueous solutions containing ammonium carbamate formed after cooling are recycled according to step (a).

11. The process of claim 8, in which the portion of the first mixed off-gas recycled according to step (e) and said ammonia feed gas of step (f) are added to the bottom section of said first zone.

12. The process of claim 8, in which the portion of the second mixed off-gas recycled according to step (j) is added to the middle section of said second zone, and said carbon dioxide feed gas of step (k) is added to the bottom section of said second zone.

13. The process of claim 8, in which said first and said second mixed off-gas streams contain an inert gas phase.

14. The process of claim 8, in which said portions of first and second mixed off-gas are recycled according to steps (e) and (j) by inducting said portions through injector type nozzles, and passing the feed gas streams of steps (f) and (k) through the respective nozzles at increased pressure.

15. The process of claim 8, in which the stripped residual liquid phase removed from the bottom section of said first zone according to step (g) is heated, prior to passing said residual liquid phase to the upper section of said second heated stripping zone.

16. The process of claim 8, in which said first portion of said urea synthesis effluent stream is stripped in said first heated stripping zone at a pressure which substantially equal to the elevated pressure of urea synthesis, and said second portion of said urea synthesis effluent stream is stripped in said second heated stripping zone at a pressure which is reduced below urea synthesis pressure.

17. The process of claim 8, in which said first portion formed according to step (b) is at least 40 percent of the total urea synthesis effluent stream.

18. The process of claim 8, in which the molar ratio of total carbon dioxide reacted according to step (a) is about 4:1.

19. The process of claim 8, in which the molar ratio of recycled mixed off-gas portion to feed gas is greater than 1 in said first and said second heated stripping zones.